United States Patent [19]

Kobayashi et al.

[11] Patent Number: 4,653,451

[45] Date of Patent: Mar. 31, 1987

[54] METHOD AND APPARATUS FOR DETECTING SURGING IN INTERNAL COMBUSTION ENGINE

[75] Inventors: Nobuyuki Kobayashi; Takashi Hattori, both of Toyota; Katsunori Yagi, Toyoake; Toshimitsu Ito, Toyota, all of Japan

[73] Assignee: Toyota Jidosha Kabushiki Kaisha, Toyota, Japan

[21] Appl. No.: 731,522

[22] Filed: May 7, 1985

[30] Foreign Application Priority Data

May 7, 1984 [JP] Japan .................................. 59-89248
Apr. 8, 1985 [JP] Japan .................................. 60-72755

[51] Int. Cl.[4] ....................... F02D 41/14; F02D 43/00; G01M 15/00

[52] U.S. Cl. ................................. 123/489; 123/41.02; 123/417; 123/571; 73/116

[58] Field of Search ............... 123/489, 440, 589, 415, 123/416, 417, 571, 41.02; 73/116, 117.3

[56] References Cited

U.S. PATENT DOCUMENTS

| | | | |
|---|---|---|---|
| 4,006,718 | 2/1977 | Konomi | 123/489 |
| 4,031,747 | 6/1977 | Blanke | 73/116 |
| 4,445,326 | 5/1984 | Lyon | 73/117.3 |

*Primary Examiner*—Andrew M. Dolinar
*Attorney, Agent, or Firm*—Cushman, Darby & Cushman

[57] ABSTRACT

In an internal combustion engine, the concentration of a specific composition is detected, and the fluctuation thereof is calculated. Surging in the engine is detected by comparing the calculated fluctuation with a predetermined value.

34 Claims, 28 Drawing Figures

ΔLN
0
1.5s
1s
0.5s
C2
C1+C2
2
C1
P1
P2
P3
P4
K3
K4
K4
t1

METHOD AND APPARATUS FOR DETECTING SURGING IN INTERNAL COMBUSTION ENGINE

BACKGROUND OF THE INVENTION

1. Field of the Invention

The present invention relates to a method and apparatus for detecting surging in an internal combustion engine.

2. Description of the Related Art

As measures taken against exhaust gas pollution and fuel consumption, a lean burn system has recently been developed. According to this lean burn system, a lean mixture sensor is provided for generating an analog current proportional to the lean air-fuel mixture in an exhaust pipe of an engine. Feedback control of the air-fuel ratio of the engine is possible using the analog output of the lean mixture sensor, thereby attaining an arbitrary air-fuel ratio on the lean side.

In such a lean burn system, the controlled air-fuel ratio is brought close to a misfiring limit to reduce the NOx emission. If the characteristics of the lean mixture sensor fluctuate, the engine may suffer from surging or misfiring, thus reducing drivability.

In the prior art, the detection of surging or misfiring is carried out by using a gravity sensor. Such a sensor, however, is disadvantageous in cost.

SUMMARY OF THE INVENTION

It is an object of the present invention to provide a method and apparatus for detecting surging in an internal combustion engine without using a gravity sensor.

Another object of the present invention is to suppress surging in the engine.

Still another object of the present invention is to reduce the NOx emission in the exhaust gas without inviting surging.

According to the present invention, the concentration of a specific composition is detected, and the fluctuation thereof is calculated. Surging in the engine is detected by comparing the calculated fluctuation with a predetermined value.

In addition, when surging is detected, a parameter of the engine such as the fuel supply (injection) amount, fuel supply (injection) timing, exhaust gas recirculation (EGR) amount, or the coolant temperature of the engine, is controlled so as to suppress surging.

When no surging is detected, the above-mentioned parameter of the engine is controlled to a level close to surging, thus reducing the NOx emission. That is, in this case, feedback of the air-fuel ratio is carried out to bring the ratio close to an optimum air-fuel ratio for both suppressing surging and reducing the NOx emission.

BRIEF DESCRIPTION OF THE DRAWINGS

The present invention will be more clearly understood from the description as set forth below with reference to the accompanying drawings, wherein.

DESCRIPTION OF THE PREFERRED EMBODIMENTS

Figure 1:
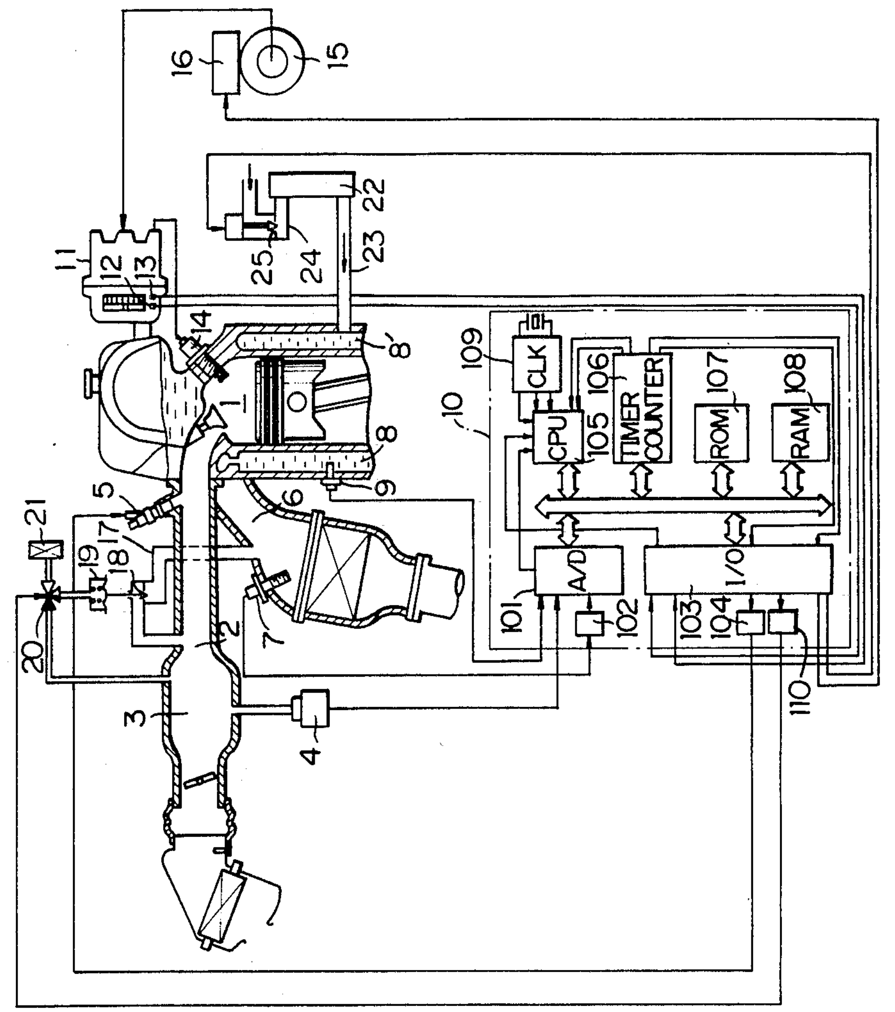
FIG. 1 is a schematic diagram of an internal combustion engine according to the present invention.

In FIG. 1, which illustrates an internal combustion engine according to the present invention, reference numeral 1 designates a four-cycle spark ignition engine disposed in an automotive vehicle. Provided in an air-intake passage 2 of the engine 1 is a surge tank 3 in which a pressure sensor 4 is provided. The pressure sensor 4 is used for detecting the absolute pressure within the intake-air passage 2 and transmits its output signal to a multiplexer-incorporating analog-to-digital (A/D) converter 101 of a control circuit 10.

Additionally provided in the air-intake passage 2 is a fuel injector 5 for supplying pressurized fuel from the fuel system (not shown) to the air-intake port of the cylinder of the engine 1. In this case, other fuel injectors are also provided for other cylinders, though not shown in FIG. 1.

Figure 2:
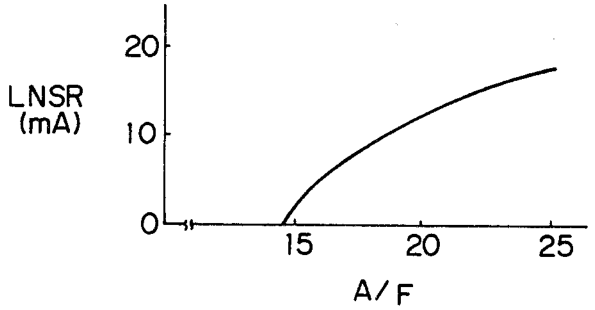
FIG. 2 is a graph showing the output characteristics of the lean mixture sensor of FIG. 1.

Provided in an exhaust gas passage 6 of the engine 1 is a lean mixture sensor 7 for detecting the concentration of oxygen composition in the exhaust gas. The lean mixture sensor 7 generates a limit current signal LNSR as shown in FIG. 2 and transmits it via a current-to-voltage converter circuit 102 of the control circuit 10 to the A/D converter 101 thereof.

Disposed in a water jacket 8 of a cylinder block of the engine 1 is a coolant sensor 9 for detecting the coolant temperature THW. The coolant sensor 9 generates an analog voltage signal in response to the coolant temperature THW and transmits it to the A/D converter 101.

Disposed in a distributor 11 are crank angle sensors 12 and 13 for detecting the angle of the crankshaft (not shown) of the engine 1. In this case, the crank-angle sensor 12 generates a pulse signal at every 720° crank angle (CA) while the crank-angle sensor 13 generates a pulse signal at every 30° CA. In this case, the pulse signals of the crank angle sensors 12 and 13 are supplied to an input/output (I/O) interface 103 of the control circuit 10. The output of the crank angle sensor 13 is then supplied to interruption terminals of a central processing unit (CPU) 105.

Provided for each cylinder is a spark plug 14 connected via the distributor 11 to an ignition coil 15 which is driven by an igniter 16. The igniter 16 is connected to the I/O interface 103 of the control circuit 10. That is, current is supplied to the igniter 16 at a current supply start timing such as at 30° CA before a current supply end timing, thus turning on the igniter 16. Then, at a current supply end timing, i.e., at an ignition timing, the igniter 16 is turned off. This ignition of one cylinder of the engine is performed.

Linked between the exhaust gas passage 6 and the intake air passage 2 is an EGR passage 17 having an EGR valve 18 therein. The EGR valve 18 is linked to a negative pressure actuator 19 which is selectively connected by a solenoid 20 to a negative pressure port of the surge tank 3 or to an atmosphere filter 21. When the solenoid 20 is energized by the control circuit 10, the negative pressure of the surge tank 3 is introduced via the solenoid 20 into the actuator 19 to open the EGR valve 18. Contrary to this, when the solenoid 20 is not energized, the atmospheric air is introduced via the filter 21 and the solenoid 20 into the actuator 19 to close the EGR valve 18. In this case, the solenoid 20 is controlled by the duty ratio of a driven signal generated from a driver circuit 110 of the control circuit 10.

Reference numeral 22 designates a radiator having a bottom tank linked via a water pipe 23 to a water jacket 8' of the engine 1 and an upper tank linked via a water pipe 24 to the water pump (not shown). Disposed in the water pipe 24 is a coolant temperature control valve 25 for adjusting the coolant temperature.

The control circuit 10, which may be constructed by a microcomputer, includes a driver circuit 104 for driving the fuel injector 5, a timer counter 106, a read-only memory (ROM) 107 for storing a main routine, interrupt routines such as a fuel injection routine, an ignition timing routine, tables (maps), constants, etc., a random-access memory 108 (RAM) for storing temporary data, a clock generator 109 for generating various clock signals, and the like, in addition to the A/D converter 101, the current-to-voltage converter circuit 102, the I/O interface 103, the CPU 105, and the driven circuit 110.

The timer counter 106 may include a free-run counter, a first compare register, a first comparator for comparing the content of the free-run counter with that of the first compare register, flag registers for a first compare interruption, injection control, and the like, thus controlling the injection start and end operation. Further, the timer counter 106 may include a second compare register, a second comparator for comparing the content of the free-run counter with that of the second compare register, flag registers for a second compare interruption ignition control, and the like, thus controlling the current supply start and end operation for ignition.

Interruptions occur at the CPU 105, when the A/D converter 101 completes an A/D conversion and generates an interrupt signal; when one of the crank angle sensors 13 generates a pulse signal; when the timer counter 106 generates a compare interrupt signal; and when the clock generator 109 generates a special clock signal.

The pressure data PM of the pressure sensor 4 and the limit current data LNSR of the lean mixture sensor 7 are fetched by an A/D conversion routine executed at every predetermined time period and are then stored in the RAM 108. That is, the data PM and LNSR in the RAM 108 are renewed at every predetermined time period. The engine speed Ne is calculated by an interrupt routine executed at 30° CA, i.e., at every pulse signal of the crank angle sensor 13, and is then stored in the RAM 108.

Figure 3A:
FIGS. 3A and 3B are timing diagrams showing the output of the lean mixture sensor of FIG. 1.
Figure 3B:
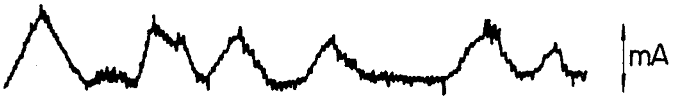

The principle for detecting surging according to the present invention will be explained with reference to FIGS. 3A and 3B. When driving in a steady state wherein the controlled air-fuel ratio is relatively on the rich side with respect to a misfiring limit, the output signal LNSR of the lean mixture sensor 7 is almost unchanged, as shown in FIG. 3A. Contrary to this, when driving in a steady state wherein the controlled air-fuel ratio is close to the misfiring limit, protrusions on the lean side are often generated in the output signal LNSR of the lean mixture sensor 7, as shown in FIG. 3B. That is, the fluctuations of the output signal in FIG. 3B are larger than in FIG. 3A. The present invention discriminates the waveform as shown in FIG. 3B from the waveform as shown in FIG. 3A, thereby detecting surging. In addition, at least one engine parameter, such as the fuel amount, the fuel supply timing, the ignition timing, the EGR amount, or the coolant temperature, is controlled in accordance with the detection of surging.

The operation of the control circuit of FIG. 1 will be explained with reference to FIGS. 4 through 11, 16, 18, 19, 21, and 23.

Figure 4:
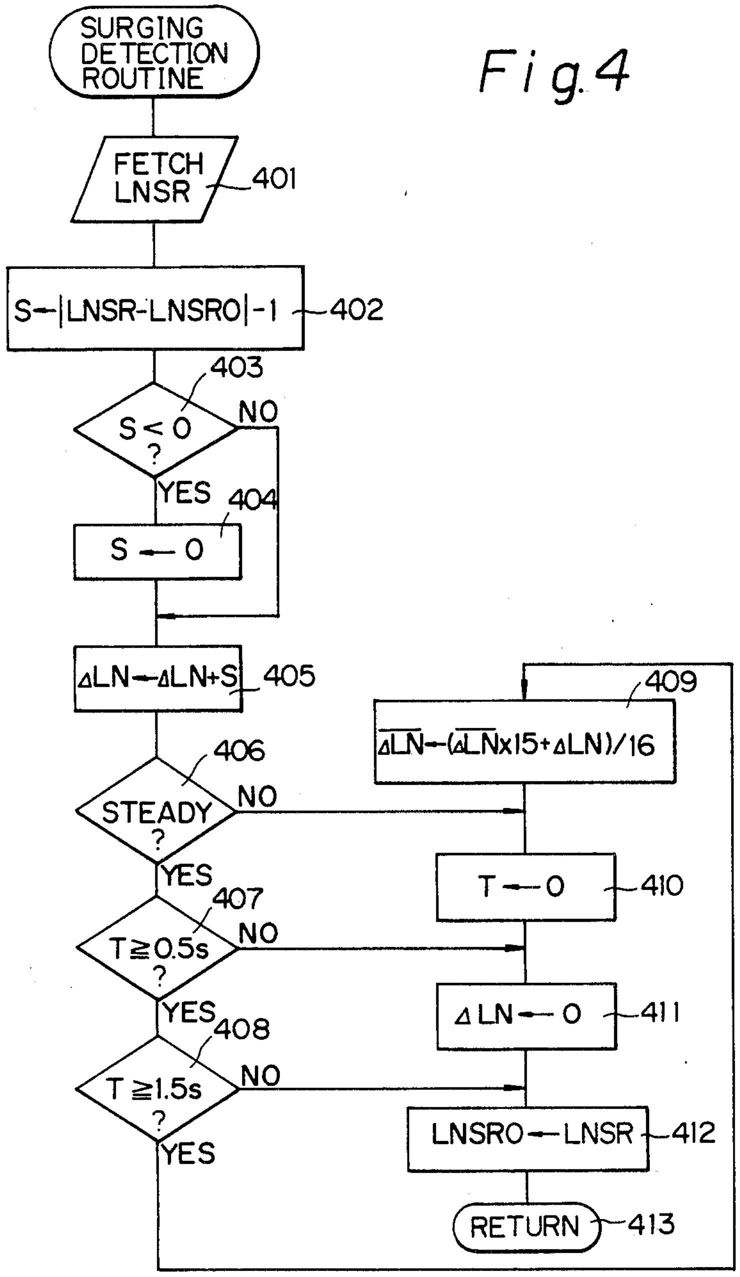
FIGS. 4 through 11, 16, 18, 19, 21, and 23 are flow charts showing the operation of the control circuit of FIG. 1.

FIG. 4 is a routine for detecting surging, which is one part of an A/D conversion routine executed at every predetermined time period.

At step 401, the output signal LNSR of the lean mixture sensor 7 is fetched from the lean mixture sensor 7 via the A/D converter 101 and is stored in the RAM 108. In this routine, note that other A/D conversions, such as the intake air pressure data PM and the coolant temperature data THW, are also fetched and then stored in the RAM 108.

At step 402, an absolute value S between the current output LNSR and the previously fetched output LNSR of the lean mixture sensor 7 is calculated by:

$$S \leftarrow |LNSR - LNSR0| - 1$$

where "1" is a constant for eliminating the fluctuation of the output signal LNSR of the lean mixture sensor 7 due to the feedback control of the air-fuel ratio. Therefore, this value "1" is not always necessary. At steps 403 and 404, the value S is guarded by a minimum value, which is, in this case, 0. That is, at step 403, it is determined whether or not $S<0$ is satisfied. Only if $S<0$ does the control proceed to step 404, which causes the value S to be 0.

At step 405, the value S is added to its cumulative value ΔLN, i.e., $$\Delta LN \leftarrow \Delta LN + S.$$

At step 406, it is determined whether or not the engine is in a steady state. For example, the conditions for a steady state are as follows:

(1) the current air-fuel ratio is larger than a predetermined value;
(2) the engine speed $N_e$ is within a predetermined range;
(3) the intake air pressure PM is within a predetermined range; and
(4) the change of the intake air pressure PM is smaller than a predetermined value.

Of course, other conditions may be required.

If not in a steady state, the control proceeds to step 410, which clears a counter T. Note that the counter T is an up counter incremented at every predetermined time period, such as 32 ms, and is used for measuring the duration of the steady state. Then, the control proceeds to step 411, which clears the cumulative value ΔLN. Then, at step 412, the value LNSRO is replaced by the content of LNSR the next execution.

Within 0.5 s after entering the steady state, the control at step 406 proceeds via step 407 to steps 411 and 412. Thus, since the counter T is not cleared, the measuring operation of the steady state duration continues.

Next, after 0.5 s after entering the steady state, the control at step 407 proceeds via step 408 to step 412. Thus, since the cumulative value ΔLN is not cleared, the accumulation of the value S calculated at step 402 starts.

After 1.5 s after entering the steady state, the control at step 408 proceeds to step 409, which calculates $$\overline{\Delta LN} \leftarrow \frac{\overline{\Delta LN} \times (n-1) + \Delta LN}{n}$$

Note that $\overline{\Delta LN}$ is a blunt value (mean value) of ΔLN, and n is, for example, 16. Then, the control proceeds via steps 410, 411, and 412 to step 413.

Note that, when the engine returns to a non-steady state before 1.5 s after entering the steady state, the control at step 406 proceeds to step 410, thus returning to an initial state.

Figure 3C:
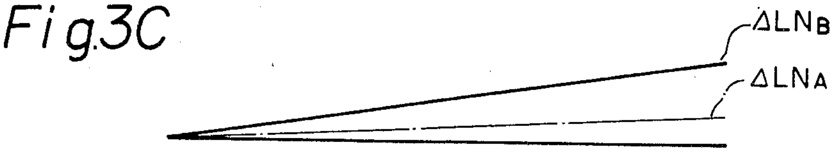
FIG. 3C is a timing diagram showing the accumulated fluctuation of the output of the lean mixture sensor of FIG. 1.

As explained above, the output signal LNSR of the lean mixture sensor 7 represents the change of the combustion state of the engine and, accordingly, the cumulative value ΔLN represents a surging level. That is, when the change of the combustion state of the engine is small, as illustrated in FIG. 3A, the cumulative value ΔLN increases slowly as indicated by a solid-dotted line $\Delta LN_A$ in FIG. 3C. Contrary to this, when the change of the combustion state of the engine is large, as illustrated in FIG. 3B, the cumulative value ΔLN increases rapidly as indicated by a solid line $\Delta LN_B$ in FIG. 3C. Thus, the degree of surging can be determined by ΔLN. In addition, the past surging levels can be reflected in the current surging level by using the blunt value $\overline{\Delta LN}$.

Figure 5:
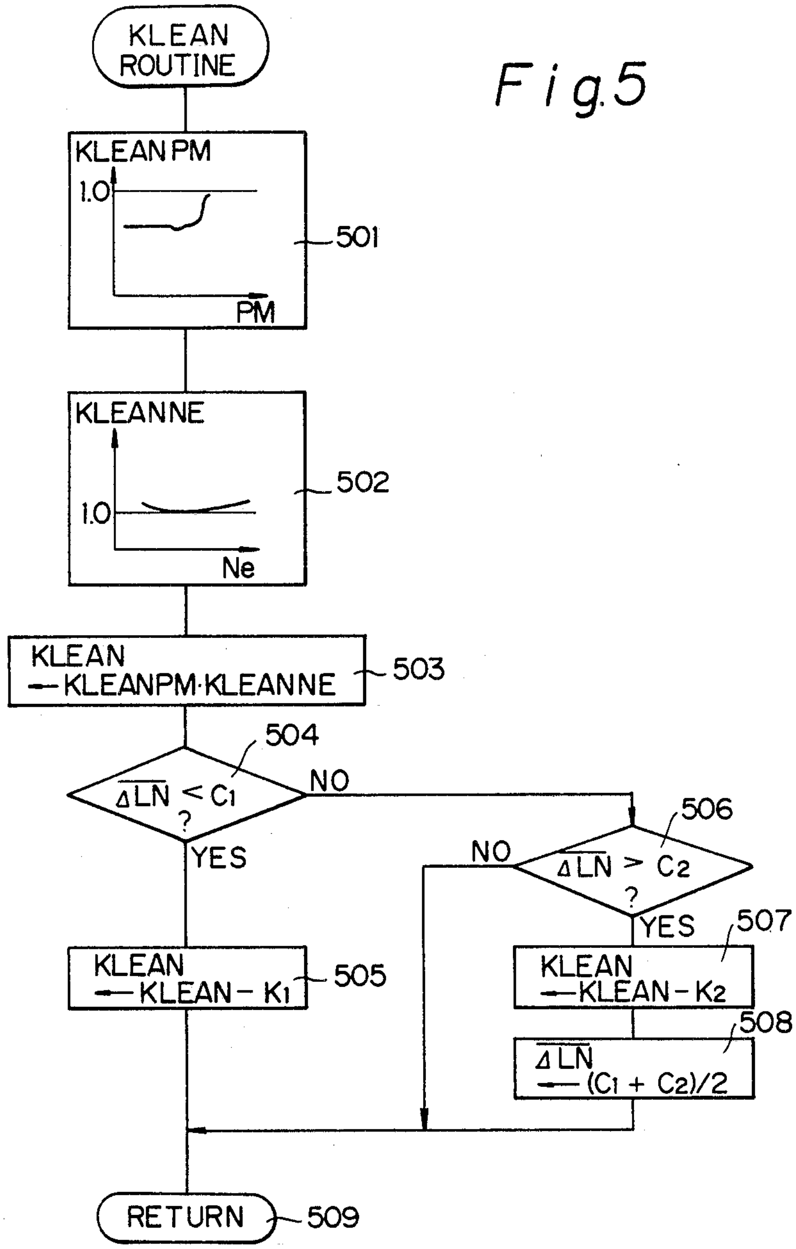

FIG. 5 is a routine for calculating a lean air-fuel ratio correction coefficient KLEAN executed at every predetermined time period. Note that the coefficient KLEAN satisfies the condition:

$$KLEAN \leqq 1.0.$$

At step 501, KLEANPM is calculated from a one-dimensional map stored in the ROM 107 by using the parameter PM as shown in the block of step 501. Also, at step 502, KLEANNE is calculated from a one-dimensional map stored in the ROM 107 by using the parameter Ne as shown on the block of step 502. Then at step 703, $$KLEAN \leftarrow KLEANPM \cdot KLEANNE.$$

At step 504, it is determined whether or not the blunt value $\overline{\Delta LN}$ satisfies $\overline{\Delta LN} < C_1$, and at step 506, it is determined whether or not the blunt value $\overline{\Delta LN}$ satisfies $\overline{\Delta LN} > C_2$. Note that $C_1$ and $C_2$ $(C_1 < C_2)$ are surging determination levels. That is, the surging determination results have hysteresis characteristics.

If $\overline{\Delta LN} < C_1$, then the control proceeds to step 505, which decreases KLEAN by $K_1$ (definite value). If $\overline{\Delta LN} > C_2$, the control proceeds to step 507, which increases KLEAN by $K_2$ (definite value). That is, if no surging is detected, KLEAN is decreases to decrease the fuel injection amount, while if surging is detected, KLEAN is increased to increase the fuel injection amount.

Then, the control at step 507 proceeds to step 508, which causes the blunt value ΔLN to be $(C_1+C_2)/2$, which is an initial value, thereby avoiding an overrich air-fuel ratio. However, this step 508 is also not always necessary.

If $C_1 \leqq \overline{\Delta LN} \leqq C_2$, the control proceeds directly to step 509. That is, KLEAN is not changed.

According to the routine 5, feedback of the air-fuel ratio, i.e., the fuel injection amount, is controlled so that the surging level is brought close to $(C_1+C_2)/2$.

Figure 6A:
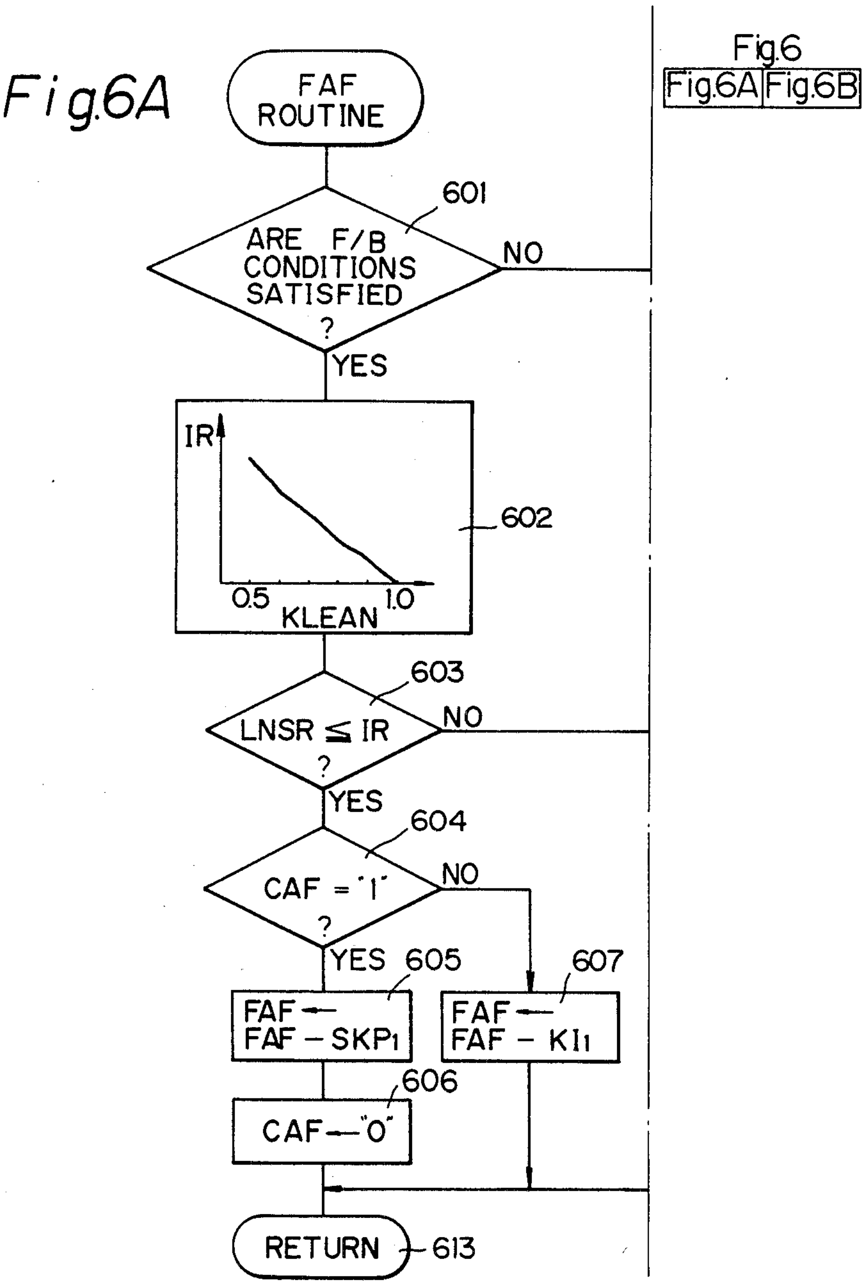
Figure 6B:
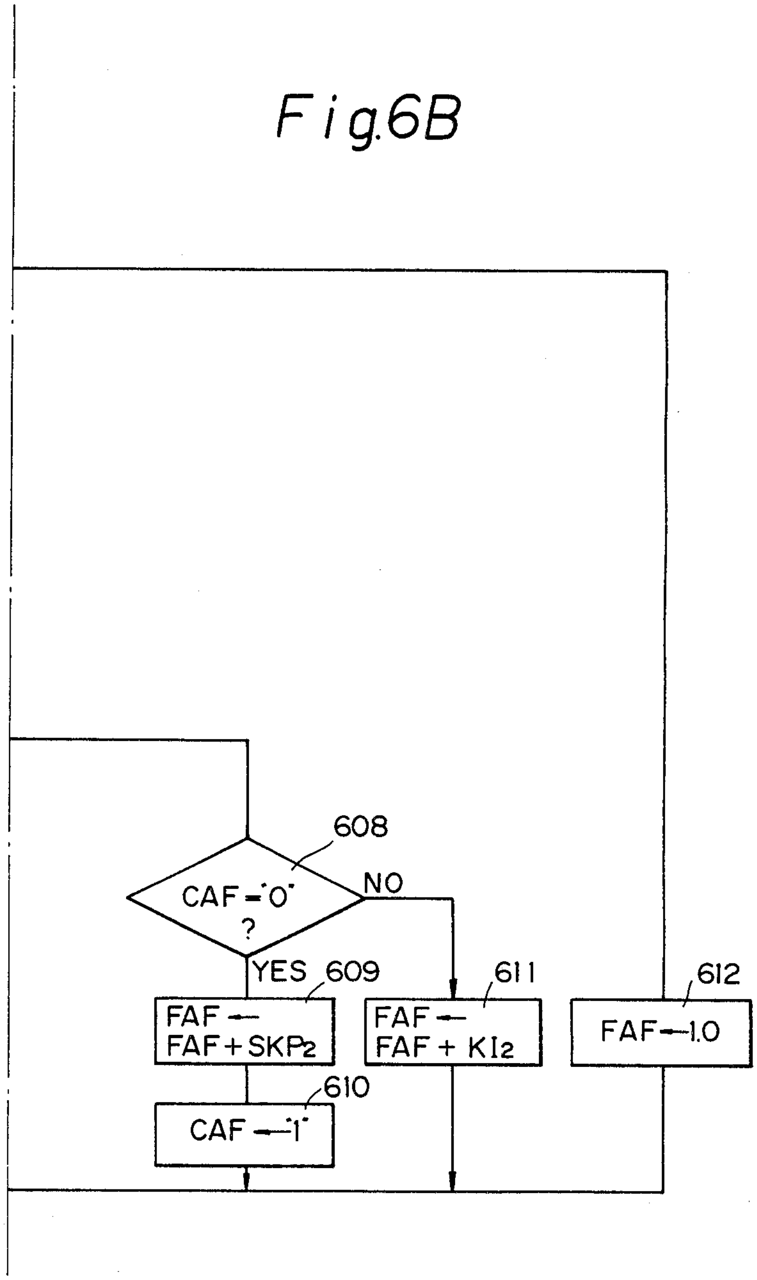

FIG. 6 is a routine for calculating an air-fuel ratio feedback correction coefficient FAF executed at every predetermined time period.

At step 601, it is determined whether or not all the feedback control (closed-loop control) conditions are satisfied. The feedback control conditions are as follows:

(i) the engine is not in a starting state;

(ii) the coolant temperature THW is higher than a definite value; and (iii) the power fuel increment FPOWER is 0.

Of course, other feedback control conditions are introduced as occasion demands. However, an explanation of such other feedback control conditions is omitted.

If one or more of the feedback control conditions is not satisfied, the control proceeds to step 612, in which the coefficient FAF is caused to be 1.0 (FAF=1.0), thereby carrying out an open-loop control operation. Contrary to this, if all the feedback control conditions are satisfied, the control proceeds to step 602.

At step 602, a comparison reference value IR is calculated from a one-dimensional map stored in the ROM 107 by using the parameter KLEAN obtained by the routine of FIG. 5. Note that this one-dimensional map is shown in the block of step 602. That is, the comparison reference value IR is variable in accordance with the coefficient KLEAN, thereby changing the aimed air-fuel ratio of the feedback control in accordance with the coefficient KLEAN.

At step 603, the output LNSR Of the lean mixture sensor 7 stored in the RAM 108 is compared with the comparison reference value IR, thereby determining whether the current air-fuel ratio is on the rich side or on the lean side with respect to the aimed air-fuel ratio. If LNSR≦IR so that the current air-fuel ratio is on the rich side, the control proceeds to step 604 which determines whether or not a skip flag CAF is "1".

Note that the value "1" of the skip flag CAF is used for a skip operation when a first change from the rich side to the lean side occurs in the controlled air-fuel ratio, while the value "0" is used for a skip operation when a first change from the lean side to the rich side occurs in the controlled air-fuel ratio.

As a result, if the skip flag CAF is "1", the control proceeds to step 605, which decreases the coefficient FAF by a relatively large amount $SKP_1$. Then, at step 606, the skip flag CAF is cleared, i.e. CAF←"0". Thus, when the control at step further carried out, the control proceeds to step 607, which decreases the coefficient FAF by a relatively small amount $K_1$. Here, $SKP_1$ is a constant for a skip operation which remarkably increases the coefficient FAF when a first change from the lean side (LNSR>IR) to the rich side (LNSR≦IR) occurs in the controlled air-fuel ratio, while $KI_1$ is a constant for an integration operation which gradually decreases the coefficient FAF when the controlled air-fuel ratio is on the rich side.

On the other hand, at step 603, if LNSR>IR so that the current air-fuel ratio is on the lean side, the control proceeds to step 608, which determines whether or not the skip flag CAF is "0". As a result, if the skip flag CAF is "0", the control proceeds to step 609, which increases the coefficient FAF by a relatively large amount $SKP_2$. Then, at step 610, the skip flag CAF is set, i.e., CAF←"1". Thus, when the control at step 608 is further carried out, the control proceeds to step 611, which increases the coefficient FAF by a relatively small amount $KI_2$. Here, $SKP_2$ is a constant for a skip operation which remarkably increases the coefficient FAF when a first change from the rich side (LNSR≦IR) to the lean side (LNSR>IR) occurs in the controlled air-fuel ratio, while $KI_2$ is a constant for an integration operation which gradually increases the coefficient FAF when the controlled air-fuel ratio is on the lean side.

The air-fuel ratio feedback correction coefficient FAF obtained at step 605, 607, 609, 611, or 612 is stored in the RAM 108, and the routine of FIG. 6 is completed by step 613.

Figure 7:
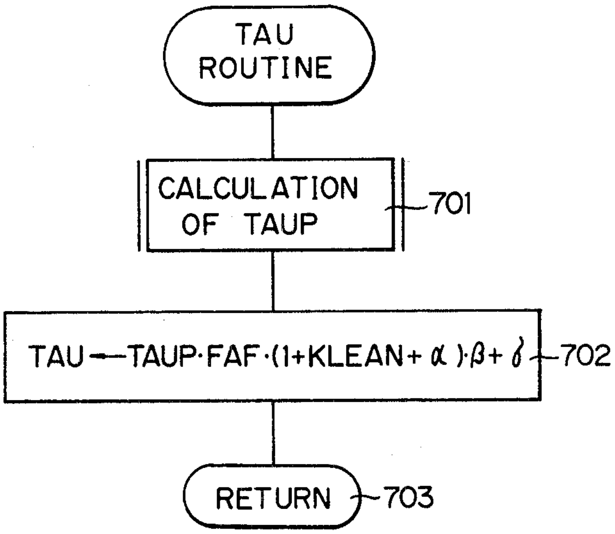

FIG. 7 is a routine for calculating a fuel injection time period TAU executed at every predetermined crank angle. For example, this routine is executed at every 360° CA in a simultaneous fuel injection system for simultaneously injecting all the injectors and is executed at every 180° CA in a sequential fuel injection system applied to a four-cylinder engine for sequentially injecting the injectors thereof.

At step 701, a fuel injection time period TAUP is calculated from a two-dimensional map stored in the ROM 107 by using the parameters PM and Ne. Then, at step 702, a fuel injection time period TAU is calculated by $$TAU \leftarrow TAUP \cdot FAF \cdot (1+KLEAN+\alpha) \cdot \beta + \gamma$$

where $\alpha$, $\beta$, and $\gamma$ are correction factors determined by other parameters such as the signal of the intake air temperature sensor, the voltage of the battery (both not shown), and the like. Then the calculated fuel injection time period TAU is stored in the RAM 108, and the routine of FIG. 7 is completed by step 703.

Figure 8:
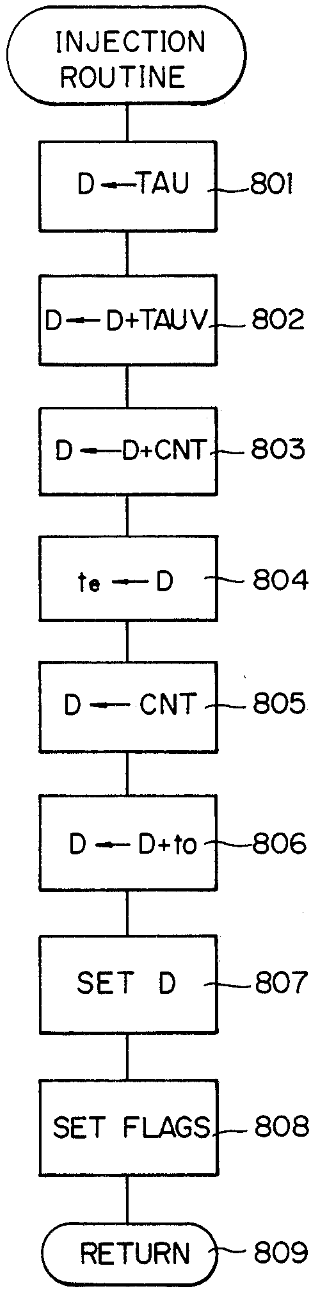

FIG. 8 is a routine for controlling the fuel injection in accordance with the fuel injection time period TAU calculated by the routine of FIG. 7, executed at every predetermined crank angle. Also, this routine is executed at every 360° CA in a simultaneous fuel injection system and is executed at every 180° CA in an sequential fuel injection system applied to a four-cylinder engine.

At step 801, the fuel injection time period TAU stored in the RAM 108 is read out and is transmitted to the D register (not shown) included in the CPU 105. At step 802, an invalid fuel injection time period TAUV which is also stored in the RAM 108 is added to the content of the D register. In addition, at step 803, the current time CNT of the free-run counter of the timer counter 106 is read out and is added to the content of the D register, thereby obtaining an injection end time $t_e$ in the D register. Therefore, at step 804, the content of the D register is stored as the injection end time $t_e$ in the RAM 108.

Again at step 805, the current time CNT of the free-run counter is read out and is set in the D register. Then, at step 806, a small time period $t_0$, which is definite or determined by the predetermined parameters, is added to the content of the D register. At step 807, the content of the D register is set in the first compare register of the timer counter 106, and at step 808, a fuel injection execution flag and a compare I interrupt permission flag are set in the registers of the timer counter 106. The routine of FIG. 8 is completed by step 809.

Figure 9:
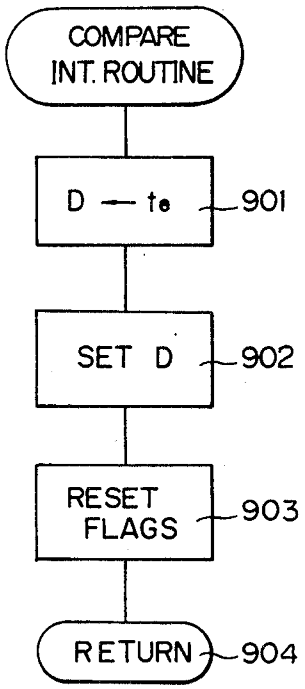

Thus, when the current time CNT of the free-run counter reaches the first compare register, an injection-on signal due to the presence of the fuel injection execution flag is transmitted from the timer counter 106 via the I/O interface 103 to the driver circuit 104, thereby initiating fuel injection by the fuel injector 7. Simultaneously, a compare I interrupt signal due to the presence of the compare I interrupt permission flag is transmitted from the timer counter 106 to the CPU 105, thereby initiating a compare I interrupt routine as illustrated in FIG. 9.

The completion of the fuel injection will be explained with reference to FIG. 9. At step 901, the injection end time $t_e$ stored in the RAM 108 is read out and is transmitted to the D register. At step 902, the content of the D register is set in the first compare register of the timer counter 106 and at step 903, the fuel injection execution flag and the compare I interrupt permission flag are reset. The routine of FIG. 9 is completed by step 904.

Thus, when the current time CNT of the free-run counter reaches the first compare register, an injection-off signal due to the absence of the fuel injection execution flag is transmitted from the timer counter 106 via the I/O interface 103 to the driver circuit 104, thereby ending the fuel injection by the fuel injector 5. In this case, however, no compare interrupt signal is generated due to the absence of the compare I interrupt permission flag.

Thus, fuel injection of the fuel injector 5 is carried out for the time period TAU.

Thus, according to the routines of FIGS. 4 through 9, as a first embodiment of the present invention, the lean air-fuel ratio correction coefficient KLEAN is controlled in accordance with the surging level, i.e., $\overline{\Delta LN}$, and accordingly, the fuel injection time period TAU is controlled in accordance with the surging level $\overline{\Delta LN}$.

A second embodiment of the present invention will be explained with reference to FIGS. 10 through 14. Note that this second embodiment also includes the routines of FIGS. 4, 6, 7, and 9.

Figure 10:
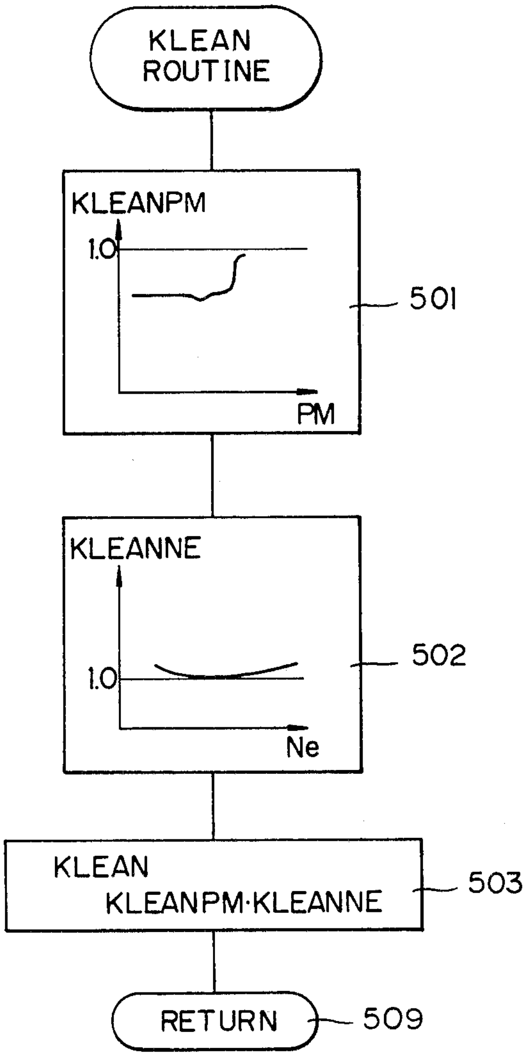
Figure 11:
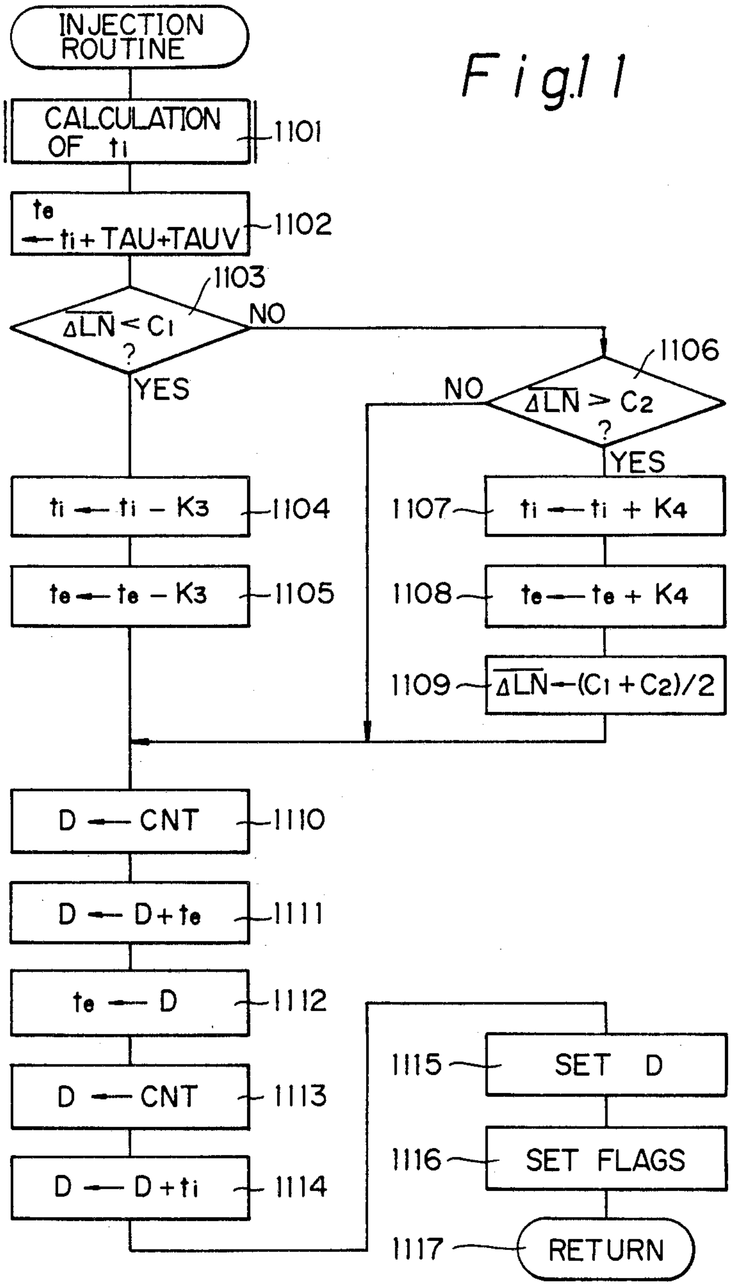

The routine of FIG. 10 is provided instead of FIG. 5 of the first embodiment. That is, the steps 504 through 508 of FIG. 5 are deleted. Therefore, in the second embodiment, the lean air-fuel ratio correction coefficient KLEAN does not change in response to the surging level, i.e., $\overline{\Delta LN}$. In addition, the routine of FIG. 11 is provided instead of FIG. 8 of the first embodiment, thereby controlling the fuel injection timing in accordance with the surging level, i.e, ΔLN.

The routine of FIG. 11 will be explained below.

At step 1101, an injection start time $t_i$ is calculated from a two-dimensional map stored on the ROM 107 by using the parameters PM and Ne. However, note that $t_i$ can be a definite time. At step 1102, an injection end time $t_e$ is calculated by:

$$t_e \leftarrow t_i + TAU + TAUV$$

where TAU is the fuel injection time period calculated by the routine of FIG. 7, and TAU is an invalid fuel injection time period.

At step 1103, it is determined whether or not the blunt value $\overline{\Delta LN}$ satisfies $\overline{\Delta LN} < C_1$, and at step 1104, it is determined whether or not the blunt value $\overline{\Delta LN}$ satisfies $\overline{\Delta LN} > C_2$ ($>C_1$).

If $\overline{\Delta LN} < C_1$, then the control proceeds to step 1104, which advances the injection start time $t_i$ by $K_3$ (definite value), and further proceeds to step 1105, which advances the injection end time $t_e$ by $K_3$. Contrary to this if $\overline{\Delta LN} > C_2$, then the control proceeds to step 1107 which delays the injection start time $t_i$ by $K_4$, (definite value), and further proceeds to step 1108, which delays the injection end time $t_e$ by $K_4$. That is, if no surging is detected, the fuel injection timing is advanced, while if surging is detected, the fuel injection timing is delayed.

Then, the control at step 1108 proceeds to step 1109, which causes the blunt value $\overline{\Delta LN}$ to be $(C_1+C_2)/2$, which is an initial value, thereby avoiding an overrich air-fuel ratio. However, this step 1109 is not always necessary.

If $C_1 \leqq \overline{\Delta LN} \leqq C_2$, the control proceeds directly to step 1110. That is, the fuel injection timing is not changed.

At step 1110, the current time CNT of the free-run counter is read out and is set in the D register. Then, at step 1111, the injection end time $t_e$ is added to the content of the D register. At step 1112, the content of the D register is stored as the final injection end time $t_e$ in the RAM 108.

Again at step 1113, the current time CNT of the free-run counter is read out and is set in the D register. Then, at step 1114, the injection start time $t_i$ is added to the content of the D register. At step 1115, the content of the D register is set in the first compare register of the timer counter 106, and at step 1116, the fuel injection execution flag and the compare I interrupt permission flag are set in the registers of the timer counter 106. The routine of FIG. 11 is completed by step 1117.

Thus, when the current time CNT of the free-run counter reaches the first compare register, an injection-on signal due to the presence of the fuel injection execution flag is transmitted from the timer counter 106 via the I/O interface 103 to the driver circuit 104, thereby initiating fuel injection by the fuel injector 5. Simultaneously, a compare I interrupt signal due to the presence of the compare I interrupt permission flag is transmitted for the timer counter 106 to the CPU 105, thereby initiating the compare I interrupt routine as illustrated in FIG. 9, which is already explained above.

Figure 12:
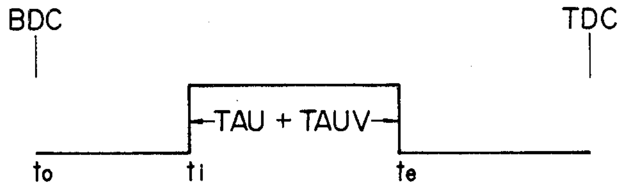
FIGS. 12 through 15 are graphs for explaining the routine of FIG. 11.

Thus, the driven circuit 104 of the control circuit 10 generates in injection pulse as shown in FIG. 12, in which DC and TDC designate a bottom dead center and a top dead center, respectively, of one cylinder.

Figures 13A, 13B, 13C:
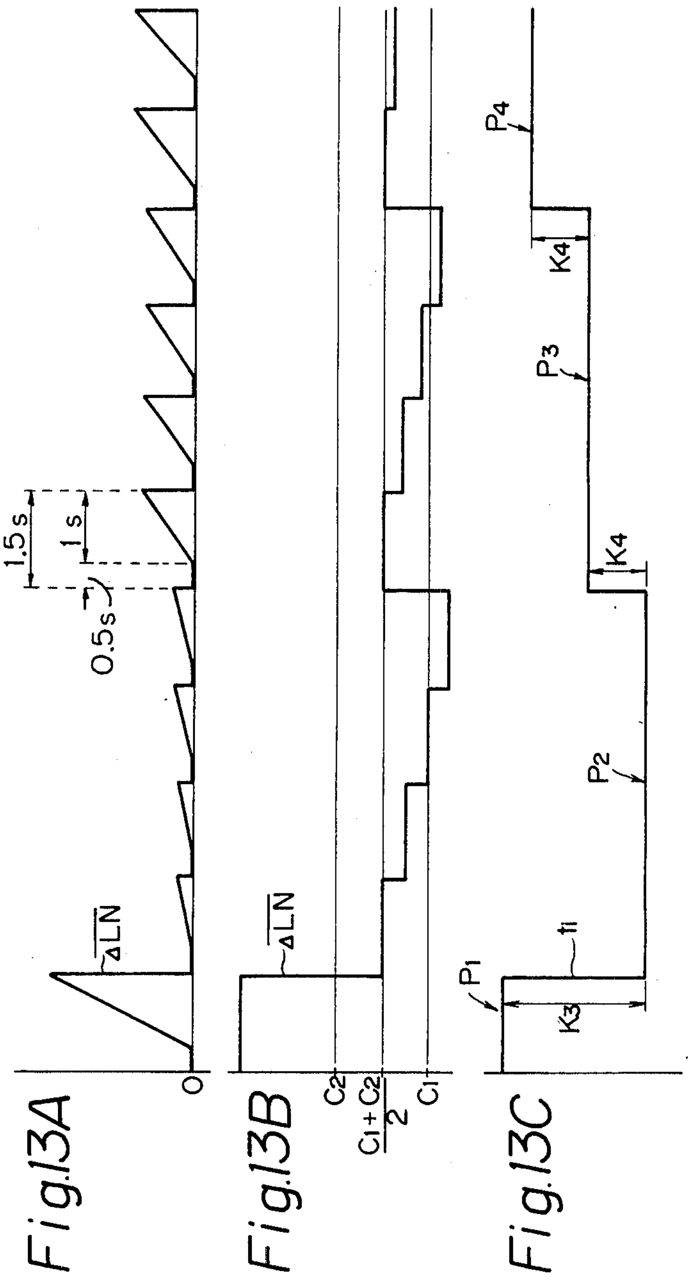

The effect according to the second embodiment as illustrated in FIGS. 10 and 11, in addition to FIGS. 4, 6, 7, and 9 will be explained with reference to FIGS. 13A, 13B, 13C, and 14. The output signal LNSR of the lean sensor 7 is accumulated for 1 s at every 1.5 s, as illustrated in FIG. 13A, and the blunt value $\overline{\Delta LN}$ is calculated at every 1.5 s as illustrated in FIG. 13B. If the blunt value $\overline{\Delta LN}$ exceeds the value $C_2$, the fuel injection timing is delayed from $P_1$ to $P_2$, as illustrated in FIG. 13C, while if the blunt value LN becomes smaller than the value $C_1$, the fuel injection timing is advanced from $P_2$ to $P_3$ (or from $P_3$ to $P_4$), as illustrated in FIG. 13C.

Figure 14:
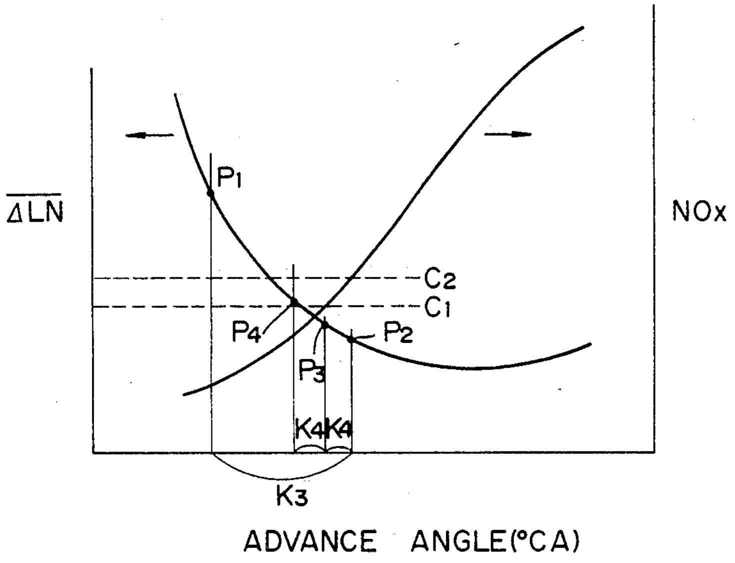

As illustrated in FIG. 14, when the fuel injection timing (advance angle) is too delayed, the NOx emission is increased, although the surging level, i.e., $\overline{\Delta LN}$ can be reduced. Contrary to this, when the fuel injection timing is too advanced, the surging level $\overline{\Delta LN}$ is enhanced, although the NOx emission can be reduced. Therefore, the values $C_1$ and $C_2$ are determined suitably for the surging level $\overline{\Delta LN}$ and the NOx emission.

Thus, according to the second embodiment, feedback of the fuel injection timing is controlled so that the degree of surging is brought close to $(C_1+C_2)/2$.

Figure 15:
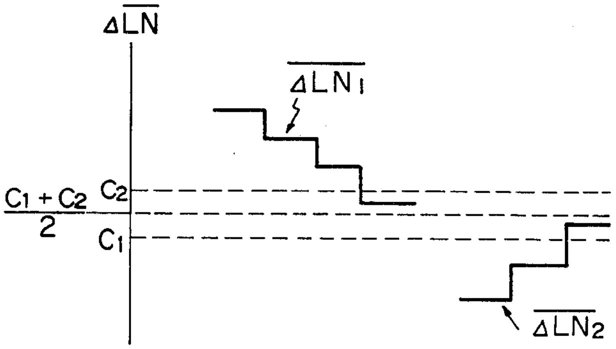

In the above-mentioned second embodiment, the delay amount $K_4$ is considerably larger than the advance amount $K_3$. However, these amounts $K_3$ and $K_4$ can be the same as each other ($K_3=K_4=K$). In this case, the surging level $\overline{\Delta LN}$ is changed as indicated by $\overline{\Delta LN_1}$ in FIG. 15, when it exceeds the value $C_1$, while it is changed as indicated by $\overline{\Delta LN_2}$ in FIG. 15, when it becomes smaller than the value $C_2$.

Figure 16:
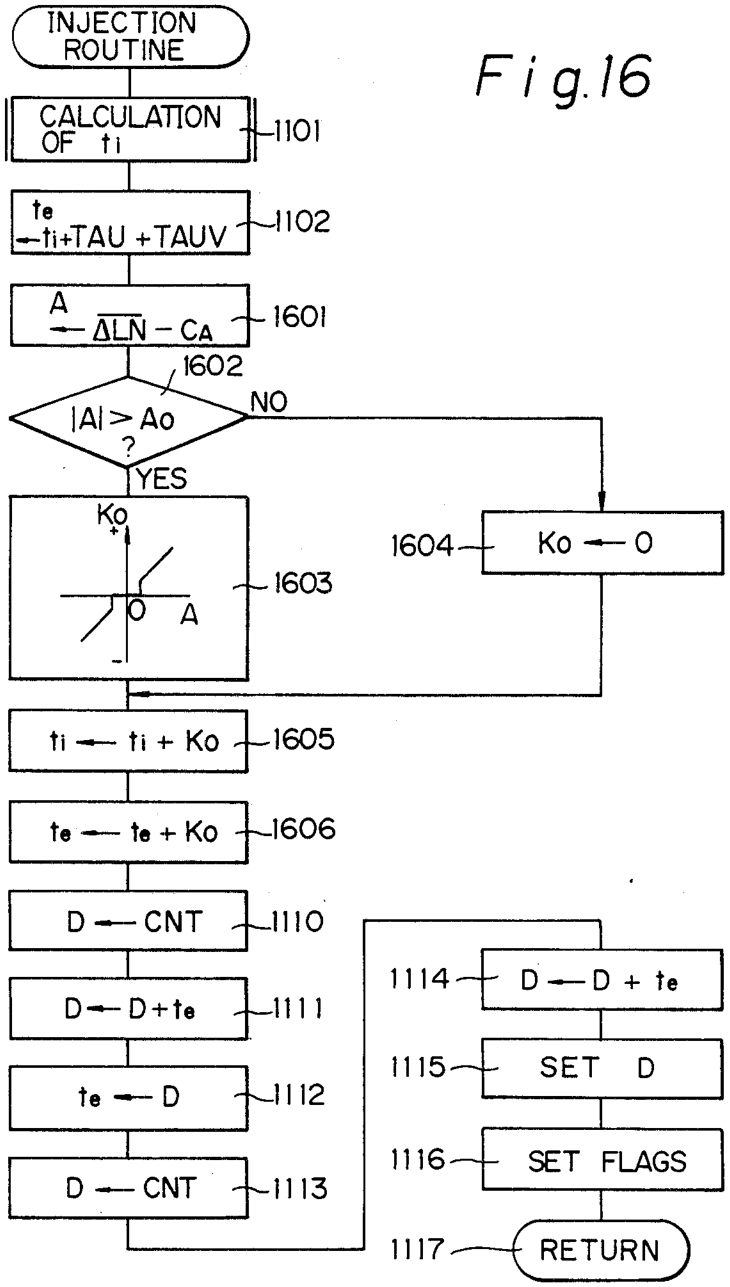

FIG. 16 is a modification of the routine of FIG. 11. In FIG. 16, steps 1601 through 1606 are provided instead of steps 1103 through 1109 of FIG. 11. That is, at step 1601, the difference A between the blunt value LN and a definite value $C_A$ is calculated, i.e., $$A \leftarrow \Delta LN - C_A.$$

The definite value $C_A$ is, for example, equal to $(C_1+C_2)/2$ (see step 1109 of FIG. 11). Then, at step 1602, it is determined whether or not $|A| > A_0$ (definite value) is satisfied. If $|A| \leqq A_0$, the control proceeds to step 1604, which clears a correction amount $K_0$ for the fuel injection timing. Contrary to this, if $|A| > A_0$, the control proceeds to step 1603, in which the correction amount $K_0$ is calculated from a one-dimensional map stored in the ROM 107 by using the parameter A as shown in the block of step 1603.

Then, at step 1605, the injection start time $t_i$ is changed by adding $K_0$ thereto. Also at step 1606, the injection end time $t_e$ is changed by adding $K_0$ thereto. In this case, if $K_0$ is positive, the fuel injection timing is delayed, while if $K_0$ is negative, the fuel injection time is advanced.

Note that the correction amount $K_0$ can be also changed by the engine speed $N_e$, the coolant temperature THW, the intake air pressure PM, and the like, in addition to the value $|\Delta LN - C_A|$.

Figure 17:
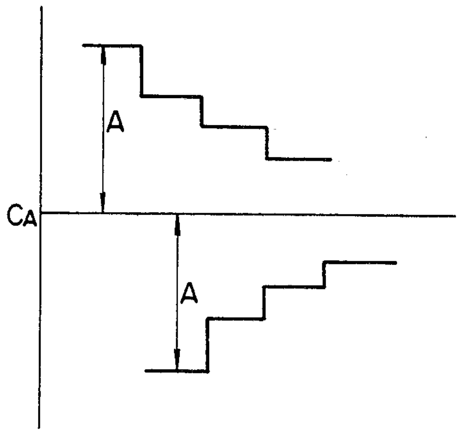
FIG. 17 is a graph for explaining the routine of FIG. 16.

In the modified second embodiment in which the routine of FIG. 16 is used instead of that of FIG. 11, the surging level, i.e., $\Delta LN$ is changed as illustrated in FIG. 17. Therefore, feedback of the fuel injection timing is also controlled so that the surging level is brought close to $C_A$ $(=(C_1+C_2)/2)$.

A third embodiment of the present invention will be explained with reference to FIGS. 18 and 19. Note that this third embodiment also includes the routine of FIG. 4.

Figure 18:
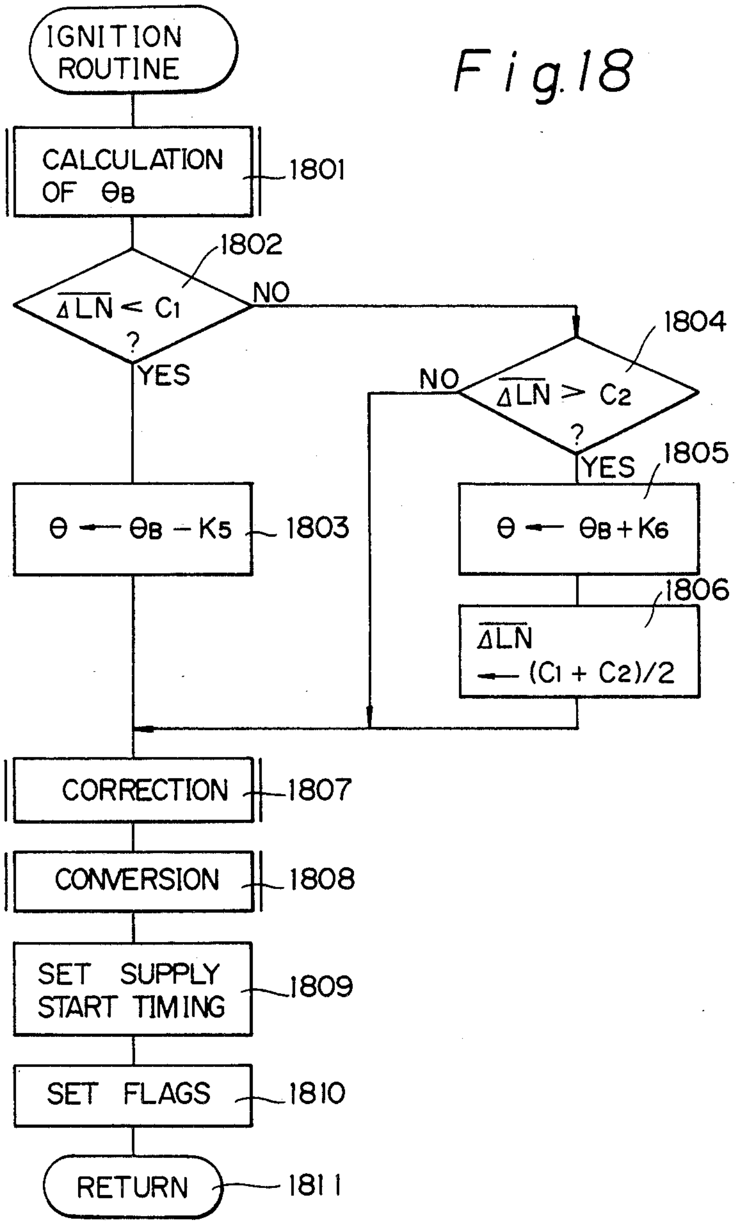
Figure 19:
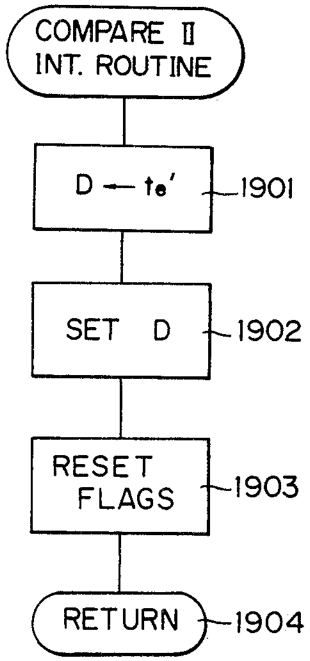

FIG. 18 is a routine for controlling an ignition timing executed at every predetermined crank angle, such as 180° CA, in a four-cylinder engine.

At step 1801, a base advance angle $\theta_B$ (°CA) is calculated from a two-dimensional map stored on the ROM 107 using the parameters PM and $N_e$.

At step 1802, it is determined whether or not the blunt value $\Delta LN$ satisfies $\Delta LN < C_1$, and at step 1804, it is determined whether or not the blunt value $\Delta LN$ satisfies $\Delta LN > C_2$.

If $\Delta LN < C_1$, then the control proceeds to step 1803, which decreases $\theta_B$ by $K_5$ (definite value), while if $\Delta LN > C_2$, the control proceeds to step 1805, which increases $\theta_B$ by $K_6$ (definite value). That is, if no surging is detected, $\theta_B$ is decreased to delay the ignition timing, while if surging is detected, $\theta_B$ is increased to advance the ignition timing. That is, in this case, the engine torque is increased by advancing the ignition timing, thus reducing surging.

Then, the control at step 1805 proceeds to step 1806 which causes the blunt value $\Delta LN$ to be $(C_1+C_2)/2$, which is an initial value, thereby avoiding the overadvance of the ignition timing. However, this step 1806 is also not always necessary.

If $C_1 \leqq \Delta LN \leqq C_2$, the control proceeds directly to step 1807. That is, $\theta_B$ is not changed.

At step 1807, the base advance value $\theta_B$ is corrected by other parameters to obtain a final ignition timing. At step 1808, the ignition timing is converted into time (current supply start timing), and a term of 30° CA is converted into time $t_e'$, which is then stored in the RAM 108.

At step 1809, the current time CNT of the free-run counter is read out and is set in the D register. The current supply start timing $t_i$ is added to the content of the D register. Then, the content of the D register is set in the second compare register of the timer counter 106.

At step 1810, a current supply execution flag and a compare II interrupt permission flag are set in the registers of the timer counter 106. The routine of FIG. 18 is completed by step 1811.

Thus, when the current time CNT of the free-run counter reaches the second compare register, a current supply signal due to the presence of the current supply execution flag is transmitted from the timer counter 106 via the I/O interface 103 to the igniter 16 thereby initiating current supply to the igniter 16. Simultaneously, a compare II interrupt signal due to the presence of the compare II interrupt permission flag is transmitted from the timer counter 106 to the CPU 105, thereby initiating a compare II interrupt routine as illustrated in FIG. 19.

The ignition (spark) will be explained with reference to FIG. 19. At step 1901, the current supply end timing $t'_e$ stored in the RAM 108 is read out and is transmitted to the D register. At step 1902, the content of the D register is set in the second compare register of the timer counter 106, and at step 1903, the current supply execution flag and the compare II interrupt permission flag are reset. The routine of FIG. 19 is completed by step 1904.

Thus, when the current time CNT of the free-run counter reaches the second compare register, a current supply end signal due to the absence of the current supply execution flag is transmitted from the timer counter 106 via the I/O interface 103 to the igniter 23 thereby generating a spark from the spark plug 14. In this case, however, no compare interrupt signal is generated due to the absence of the compare II interrupt permission flag.

Figure 20:
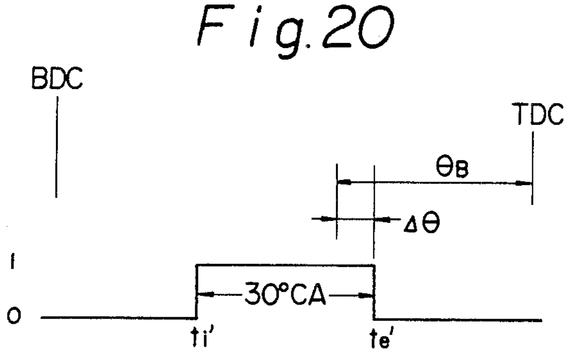
FIG. 20 is a graph for explaining the routines of FIGS. 18 and 19.

Thus, the igniter 16 is turned on before 30° CA of the ignition timing, and the igniter 16 is turned off at the ignition timing. That is, an ignition signal as shown in FIG. 20 is generated. Note that $\Delta\theta$ of FIG. 20 represents the correction amount by steps 1803, 1805, and 1807.

According to the third embodiment, feedback of the ignition timing is controlled so that the surging level is brought close to $(C_1+C_2)/2$.

A fourth embodiment of the present invention will be explained with reference to FIG. 21. Note that this fourth embodiment also includes the routine of FIG. 4.

Figure 21:
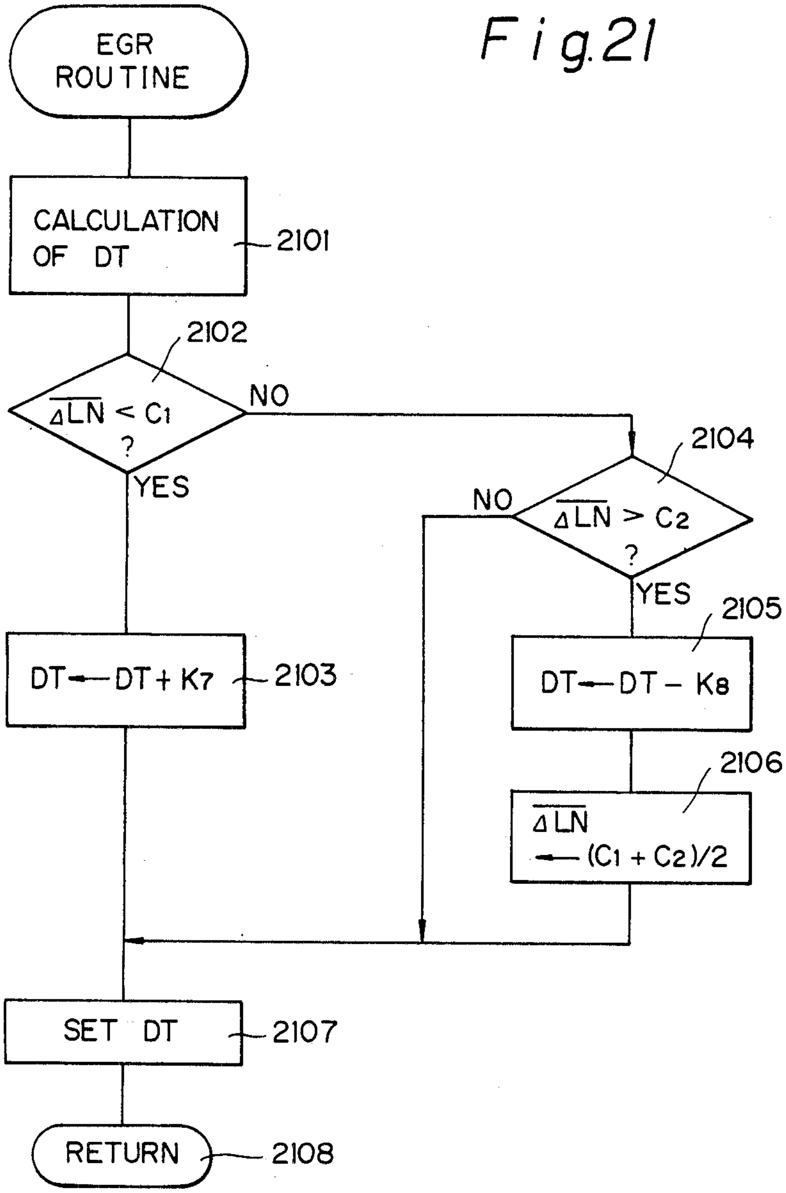

FIG. 21 is a routine for controlling the opening of the EGR value 17 executed at every predetermined time period.

At step 2101, a duty ratio DT is calculated from a two-dimensional map stored on the ROM 107 using the parameters PM and $N_e$.

At step 2102, it is determined whether or not the blunt value $\overline{\Delta LN}$ satisfies $\overline{\Delta LN} < C_1$, and at step 2104, it is determined whether or not the blunt value $\overline{\Delta LN}$ satisfies $\overline{\Delta LN} > C_2$.

If $\overline{\Delta LN} < C_1$, then the control proceeds to step 2103, which increases DT by $K_7$ (definite value), while if $\overline{\Delta LN} > C_2$, the control proceeds to step 2105, which decreases DT by $K_8$ (definite value). That is, if no surging is detected, DT is increased to increase the EGR amount, while if surging is detected, DT is decreased to decrease the EGR amount.

Then, the control at step 2105 proceeds to step 2106, which causes the blunt value $\overline{\Delta LN}$ to be $(C_1+C_2)/2$, which is an initial value, thereby avoiding overage of the EGR amount. However, this step 2106 is not always necessary.

If $C_1 \leqq \overline{\Delta LN} \leqq C_2$, the control proceeds directly to step 2107. That is, DT is not changed.

Figure 22:
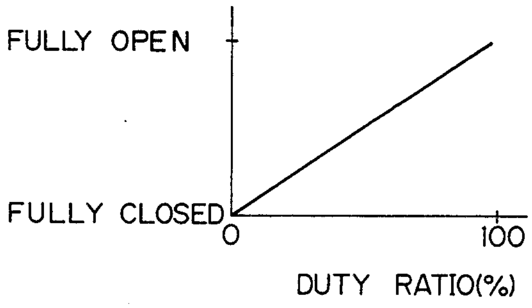
FIG. 22 is a graph for explaining the routine of FIG. 21.

At step 2107, the calculated duty ratio DT is set in the driver circuit 110, and accordingly, a driving signal having the duty-ratio DT is applied by the driver circuit 110 to the solenoid 19, thus controlling the EGR value 17. Note that the opening of the EGR valve 17 has a relationship to the duty ratio DT of the driving signal as shown in FIG. 22. Then, the routine of FIG. 21 is completed by step 2108.

According to the fourth embodiment, when the surging level, i.e., $\overline{\Delta LN}$ is large, the EGR amount is decreased, while when the surging level is small, the EGR amount is increased. That is, feedback of the EGR amount is controlled so that the surging level is brought close to $(C_1+C_2)/2$.

Note that the present invention can be also applied to a system in which the EGR valve 17 is controlled by a step motor or the like, instead of the duty ratio control.

A fifth embodiment of the present invention will be explained with reference to FIG. 23. Note that this fifth embodiment also includes the routine of FIG. 4.

Figure 23:
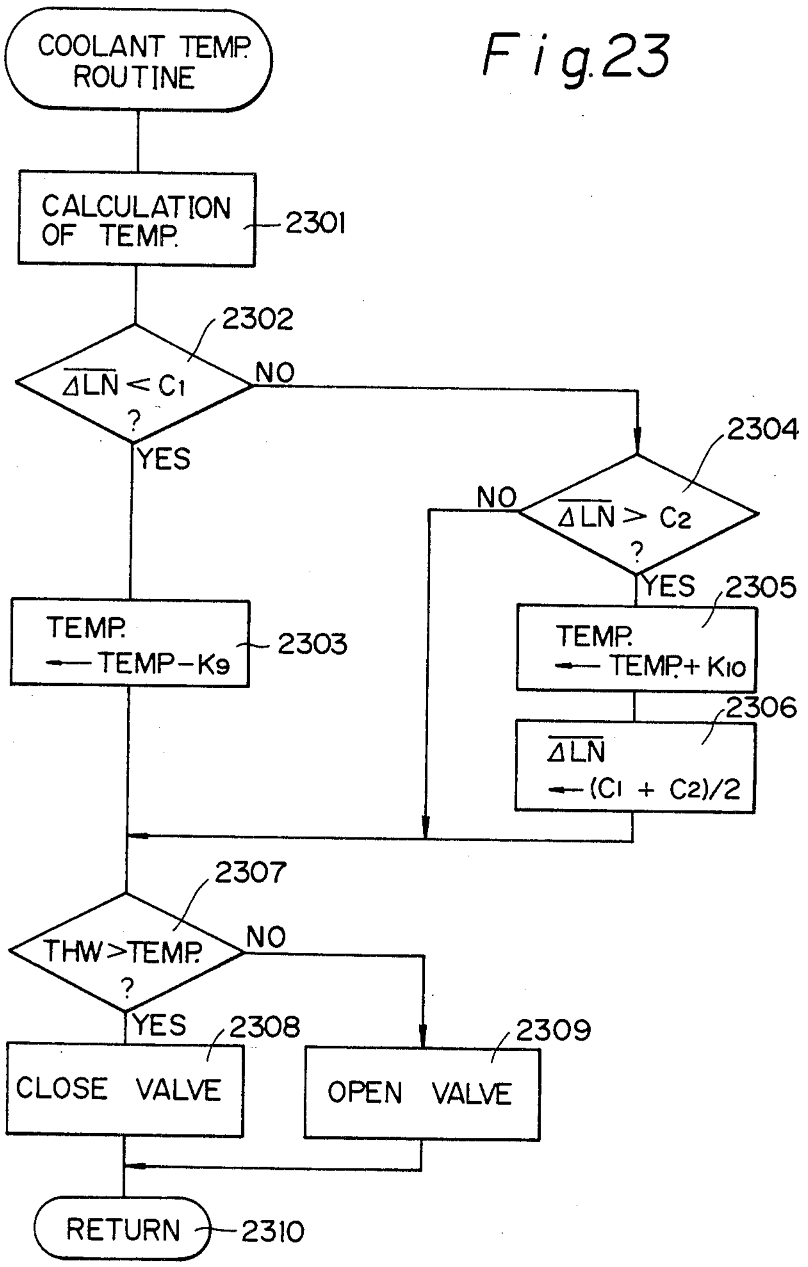

FIG. 23 is a routine for controlling the coolant temperature THW executed at every predetermined time period.

At step 2301, an aimed coolant duty ratio temperature TEMP is calculated from a two-dimensional map stored on the ROM 107 using the parameters PM and $N_e$.

At step 2302, it is determined whether or not the blunt value $\overline{\Delta LN}$ satisfies $\overline{\Delta LN} < C_1$, and at step 2304, it is determined whether or not the blunt value $\overline{\Delta LN}$ satisfies $\overline{\Delta LN} > C_2$.

If $\Delta LN < C_1$, then the control proceeds to step 2303, which increases TEMP by $K_9$ (definite value), while if $\overline{\Delta LN} > C_2$, the control proceeds to step 2305, which decreases TEMP by $K_{10}$ (definite value). That is, if no surging is detected, TEMP is decreased to decrease the coolant temperature THW, while if surging is detected, TEMP is decreased to increase coolant temperature THW.

Then, the control at step 2305 proceeds to step 2306, which causes the blunt value $\overline{\Delta LN}$ to be $(C_1+C_2)/2$, which is an initial value, thereby avoiding overheating of the coolant. However, this step 2306 is not always necessary.

If $C_1 \leqq \Delta LN \leqq C_2$, the control proceeds directly to step 2307. That is, TEMP is not changed.

At step 2307, it is determined whether or not the current coolant temperature THW is larger than the aimed temperature TEMP. If THW>TEMP, at step 2308, the (PL) 105 closes the control valve 25, while if THW≦TEMP, the CPU 105 opens the control valve 25. That is, the control valve 25 is driven so that the coolant temperature THW is brought close to the aimed temperature TEMP. Then, this routine of FIG. 23 is completed by step 2310.

According to the fifth embodiment, when the surging level, i.e., $\overline{\Delta LN}$, is large, the coolant temperature THW is increased, while when the surging level is small, the coolant temperature THW is decreased. That is, feedback of the coolant temperature THW controlled so that the surging level is brought close to $(C_1+C_2)/2$.

Note that the present invention can be also applied to a fuel injection system using the other parameters such as the intake air amount and the engine speed or the throttle opening value and the engine speed.

As explained hereinbefore, according to the present invention, surging or misfiring can be detected without using a gravity sensor, thus reducing manufacturing costs.

We claim:

1. A method for detecting surging in an internal combustion engine, comprising the steps of:
- detecting the concentration of a specific composition in the exhaust gas;
- determining whether or not said engine is in a steady state;
- calculating the fluctuation of the concentration of the specific composition in the exhaust gas, when the engine is in a steady state; and
- determining whether or not the calculated fluctuation of the concentration of the specific composition is larger than a predetermined value, thereby considering that surging occurs when the calculated fluctuation of the concentration of the specific composition is larger than the definite value,
- wherein said concentration fluctuation calculating step comprises the steps of:
- calculating the difference in concentration for every predetermined time period;
- accumulating a number of calculated differences; and
- calculating a mean value of anumber of cumulative differences.

2. A method as set forth in claim 1, further comprising a step of controlling at least one parameter of said engine to suppress said surging, when the calculated fluctuation of the concentration is larger than the definite value.

3. A method as set forth in claim 2, further comprising a step of resetting the cumulative difference in concentration of the specific composition.

4. A method as set forth in claim 2, further comprising a step of controlling said at least one parameter of said engine to be a level close to that wherein surging occurs, when the calculated fluctuation of the concentration is smaller than the definite value.

5. A method as set forth in claim 2, wherein said parameter controlling step for suppressing surging comprises a step of increasing the amount of fuel supplied to said engine.

6. A method as set forth in claim 4, wherein said parameter controlling step for a level close to that wherein surging occurs comprises as step of decreasing the amount of fuel supplied to said engine.

7. A method as set forth in claim 2, wherein said parameter controlling step for suppressing surging comprises a step of delaying a timing of supplying fuel to said engine.

8. A method as set forth in claim 4, wherein said parameter controlling step for a level close to that wherein surging occurs comprises a step of advancing a timing of supplying fuel to said engine.

9. A method as set forth in claim 2, further comprising a step of calculating the difference between the calculated fluctuation of the concentration of the specific composition and a predetermined value, wherein said parameter controlling step for suppressing surging comprises a step of delaying a timing of supplying fuel to said engine by an amount in accordance with the above-mentioned difference.

10. A method as set forth in claim 4, further comprising a step of calculating the difference between the calculated fluctuation of the concentration of the specific composition and a predetermined value, wherein said parameter controlling step for a level close to that wherein surging occurs comprises a step of advancing a timing for supplying fuel to said engine by an amount in accordance with the above-mentioned difference.

11. A method as set forth in claim 2, wherein said parameter controlling step for suppressing surging comprises a step of delaying an ignition timing of said engine.

12. A method as set forth in claim 4, wherein said parameter controlling step for a level close to that wherein surging occurs comprises a step of advancing an ignition timing of said engine.

13. A method as set forth in claim 2, wherein said parameter controlling step for suppressing surging comprises a step of delaying an EGR amount to said engine.

14. A method as set forth in claim 4, wherein said parameter controlling step for a level close to suffering from surging comprises a step of advancing an EGR amount to said engine.

15. A method as set forth in claim 2, wherein said parameter controlling step for suppressing surging comprises a step of increasing the coolant temperature of said engine.

16. A method as set forth in claim 4, wherein said parameter controlling step for a level close to that wherein surging occurs comprises a step of reducing the coolant temperature of said engine.

17. A method for detecting surging in an internal combustion engine, comprising the steps of:
- detecting the concentration of a specific composition in the exhaust gas;
- determining whether or not said engine is in a steady state;
- calculating the fluctuation of the concentration of the specific composition in the exhaust gas, when the engine is in a steady state; and
- determining whether or not the calculated fluctuation of the concentration of the specific composition is larger than a predetermined value, thereby considering that surging occurs when the calculated fluctuation of the concentration of the specific composition is larger than the definite value,
- wherein said surging determination step comprises the steps of:
- determining whether or not the calculated fluctuation of the concentration of the specific composition is smaller than a first definite value;
- determining whether or not the calculated fluctuation of the concentration of the specific composition is larger than a second definite value which is larger than the first definite value;
- considering that the calculated fluctuation of the concentration of the specific composition is smaller than the predetermined value, when it is smaller than the first definite value; and considering that the calculated fluctuation of the concentration of the specific composition is larger than the predetermined value, when it is larger than the second definite value.

18. An apparatus for detecting surging in an internal combustion engine, comprising:

means for detecting the concentration of a specific composition in the exhaust gas;

means for determining whether or not said engine is in a steady state;

means for calculating the fluctuation of the concentration of the specific composition in the exhaust gas, when the engine is in a steady state; and means for determining whether or not the calculated fluctuation of the concentration of the specific composition is larger than a predetermined value, thereby considering that surging occurs when the calculated fluctuation of the concentration of the specific composition is larger than the definite value, wherein said concentration fluctuation calculating means comprises:

means for calculating the difference in concentration for a definite time;

means for accumulating a number of calculated differences; and means for calculating a mean value of a number of cumulative differences.

19. An apparatus as set forth in claim 18, further comprising means for controlling at least one parameter of said engine to suppress said surging, when the calculated fluctuation of the concentration is larger than the definite value.

20. An apparatus as set forth in claim 19, further comprising means for detecting the cumulative difference in concentration of the specific composition.

21. An apparatus as set forth in claim 19, further comprising means for controlling said at least one parameter of said engine to be a level close to that wherein surging occurs, when the calculated fluctuation of the concentration is smaller than the definite value.

22. An apparatus as set forth in claim 19, wherein said parameter controlling means for suppressing surging comprises means for increasing the amount of fuel supplied to said engine.

23. An apparatus as set forth in claim 21, wherein said parameter controlling means for suppressing surging comprises means for decreasing the amount of fuel supplied to said engine.

24. An apparatus as set forth in claim 19, wherein said parameter controlling means for suppressing surging comprises means for delaying a timing of supplying fuel to said engine.

25. An apparatus as set forth in claim 21, wherein said parameter controlling means for a level close to that wherein surging occurs comprises means for advancing a timing of supplying fuel to said engine.

26. An apparatus as set forth in claim 19, further comprising means for calculating the difference between the calculated fluctuation of the concentration of the specific composition and a predetermined value, wherein said parameter controlling means for suppressing surging comprises a means for delaying a timing of supplying fuel to said engine by an amount in accordance with the above-mentioned difference.

27. An apparatus as set forth in claim 21, further comprising means for calculating the difference between the calculated fluctuation of the concentration of the specific composition and a predetermined value, wherein said parameter controlling means for a level close to that wherein surging occurs comprises means for advancing a timing of supplying fuel to said engine by an amount in accordance with the above-mentioned difference.

28. An apparatus as set forth in claim 19, wherein said parameter controlling means for suppressing surging comprises means for delaying an ignition timing of said engine.

29. An apparatus as set forth in claim 21, wherein said parameter controlling means for suppressing surging comprises means for advancing an ignition timing of said engine.

30. An apparatus as set for forth in claim 19, wherein said parameter controlling means for suppressing surging comprises means for delaying an EGR amount to said engine.

31. An apparatus as set forth in claim 21, wherein said parameter controlling means for suppressing surging comprises means for advancing an EGR amount to said engine.

32. An apparatus as set forth in claim 21, wherein said parameter controlling means for suppressing surging comprises means for increasing the coolant temperature of said engine.

33. An apparatus as set forth in claim 21, wherein said parameter controlling means for suppressing surging comprises means for reducing the coolant temperature of said engine.

34. An apparatus for detecting surging in an internal combustion engine, comprising:

means for detecting the concentration of a specific composition in the exhaust gas;

means for determining whether or not said engine is in a steady state;

means for calculating the fluctuation of the concentration of the specific composition in the exhaust gas, when the engine is in a steady state; and means for determining whether or not the calculated fluctuation of the concentration of the specific composition is larger than a predetermined value, thereby considering that surging occurs when the calculated fluctuation of the concentration of the specific composition is larger than the definite value, wherein said surging determination means comprises:

means for determining whether or not the calculated fluctuation of the concentration of the specific composition is smaller than a first definite value;

means for determining whether or not the calculated fluctuation of the concentration of the specific composition is larger than a second definite value; which is larger than the first definite value;

means for considering that the calculated fluctuation of the concentration of the specific composition is smaller than the predetermined value, when it is smaller than the first definite value; and means for considering that the calculated fluctuation of the concentration of the specific composition is larger than the predetermined value, when it is larger than the second definite value.

* * * * *